United States Patent
Liu

(10) Patent No.: US 9,832,297 B2
(45) Date of Patent: Nov. 28, 2017

(54) DEVICE INCLUDING INTERFACE

(71) Applicant: ZTE Corporation, Shenzhen (CN)

(72) Inventor: Zhuang Liu, Shenzhen (CN)

(73) Assignee: XI'AN ZHONGXING NEW SOFTWARE CO. LTD., Xi'An (CN)

( * ) Notice: Subject to any disclaimer, the term of this patent is extended or adjusted under 35 U.S.C. 154(b) by 0 days.

(21) Appl. No.: 15/036,496

(22) PCT Filed: May 4, 2014

(86) PCT No.: PCT/CN2014/076740
§ 371 (c)(1),
(2) Date: May 13, 2016

(87) PCT Pub. No.: WO2014/177064
PCT Pub. Date: Nov. 6, 2014

(65) Prior Publication Data
US 2016/0301784 A1   Oct. 13, 2016

(30) Foreign Application Priority Data

Nov. 13, 2013  (CN) .................... 2013 2 0718077 U

(51) Int. Cl.
| | | |
|---|---|---|
| H04M 1/274 | (2006.01) | |
| H04M 1/02 | (2006.01) | |
| H04M 1/22 | (2006.01) | |
| H04B 10/50 | (2013.01) | |

(52) U.S. Cl.
CPC ........ *H04M 1/0274* (2013.01); *H04B 10/502* (2013.01); *H04M 1/22* (2013.01)

(58) Field of Classification Search
CPC ....................................................... H01R 13/64
See application file for complete search history.

(56) References Cited

U.S. PATENT DOCUMENTS

| | | | |
|---|---|---|---|
| 8,188,878 B2* | 5/2012 | Pederson ........... | G07C 9/00158 340/815.45 |
| 9,455,783 B2* | 9/2016 | Pederson ............. | H04B 10/116 |
| 2003/0194906 A1* | 10/2003 | Arkin ................... | H01R 13/717 439/490 |
| 2003/0201462 A1* | 10/2003 | Pommer ............... | G02B 6/4201 257/200 |
| 2004/0153595 A1* | 8/2004 | Sukegawa ............ | G06K 19/077 710/305 |
| 2007/0147843 A1* | 6/2007 | Fujiwara ............ | H04B 10/1143 398/118 |

(Continued)

FOREIGN PATENT DOCUMENTS

| | | |
|---|---|---|
| CN | 201194404 Y | 2/2009 |
| CN | 103124304 A | 5/2013 |

OTHER PUBLICATIONS

International Search Report for corresponding application PCT/CN2014/076740 filed on May 4, 2014; dated Jul. 22, 2014.

*Primary Examiner* — Cindy Trandai
(74) *Attorney, Agent, or Firm* — Cantor Colburn LLP

(57) ABSTRACT

The present disclosure provides a device including an interface. By adopting the device with a luminous part arranged at a physical interface, the problem of difficulty in accurately finding a position of the physical interface of the device in a dark environment is solved, so that a user can conveniently and rapidly identify the position and direction of the physical interface, and a user experience is improved.

8 Claims, 9 Drawing Sheets

(56) References Cited

U.S. PATENT DOCUMENTS

| | | | | |
|---|---|---|---|---|
| 2007/0269219 | A1* | 11/2007 | Teller | H04B 10/803 398/140 |
| 2008/0079538 | A1* | 4/2008 | Davis | G09F 3/204 340/5.91 |
| 2008/0150879 | A1* | 6/2008 | Kang | G09G 3/3413 345/102 |
| 2008/0224025 | A1* | 9/2008 | Lyons | G01J 1/32 250/205 |
| 2009/0141440 | A1* | 6/2009 | Okumura | G06K 19/07732 361/679.32 |
| 2010/0060194 | A1* | 3/2010 | Furry | H05B 33/0803 315/294 |
| 2010/0104350 | A1* | 4/2010 | Hu | B43K 29/10 401/195 |
| 2011/0305460 | A1* | 12/2011 | Snyder | H04B 10/43 398/140 |
| 2012/0329313 | A1* | 12/2012 | Chang | H01R 13/7172 439/488 |
| 2014/0185989 | A1* | 7/2014 | Woodruff | G02B 6/36 385/77 |
| 2014/0301062 | A1* | 10/2014 | David | F21V 13/08 362/84 |
| 2016/0172796 | A1* | 6/2016 | Humphreys | H01R 13/7175 439/620.21 |
| 2016/0241067 | A1* | 8/2016 | Miracle | H02J 7/0047 |

\* cited by examiner

DEVICE INCLUDING INTERFACE

TECHNICAL FIELD

The present disclosure relates to the field of communication, and in particular to a device including an interface

BACKGROUND

At present, mobile phones have been greatly involved in daily life of people. As one of the most important interfaces of a mobile phone, a Universal Serial Bus (USB) interface is the most basic device in each mobile phone. Designs of mobile phones tend to be large, thin and light, and under such a tendency, conventional USB interfaces will certainly be eliminated and replaced with more compact mini-USB interfaces and micro-USB interfaces. Micro-USB interfaces are the most common USB interfaces on the current market.

Since wireless charging has not yet been popularized in a large scale, most of mobile phones can only support USB interface charging. The inventor discovers in a research process that it is difficult for a user to accurately plug a charger into a USB female interface on a mobile phone in a dark place under the condition that the micro-USB charger is flat and narrow, one reason is that USB interfaces have a difference in positive and negative directions and directions of male and female interfaces are required to be consistent, and another reason is that a position of the female interface in the mobile phone cannot be accurately found. Although a screen of a mobile phone can emit light, a direction of the light is perpendicular to a direction of a USB interface, and under the interference of the light, a lateral surface where the USB interface is located becomes a blind area.

Under such a condition, the user has to try to look for the position with double hands, and has to look for the position again if the directions of the USB male and female interfaces are inconsistent; or the user has to find the position to finish charging by virtue of another light source, which brings inconvenience.

For the problem of difficulty in accurately finding a position of a USB interface on a device in a dark environment in a related technology, there is yet no effective solution.

SUMMARY

For the problem of difficulty in accurately finding a position of a physical interface of a device in a dark environment, the embodiments of the present disclosure provide a device including an interface, so as to at least solve the problem.

According to one aspect of the embodiments of the present disclosure, a device including an interface is provided, which may include: a housing and a physical interface embedded into the housing, and further include: a luminous part, arranged at a position close to the physical interface.

In an example embodiment, the luminous part may include one or more Light Emitting Diodes (LEDs).

In an example embodiment, a part around the physical interface in the housing may be made from a transparent material.

In an example embodiment, the device may further include: a control part, coupled to the luminous part and configured to control turning-on and turning-off of the luminous part.

In an example embodiment, the control part may include: a driving circuit, coupled to the luminous part and configured to drive the luminous part to emit light; and a processor, coupled to the driving circuit and configured to send a driving signal to the driving circuit according to received information, wherein the driving signal may be used for instructing the driving circuit to drive the luminous part to emit light.

In an example embodiment, the control part may further include: a light sensor, coupled to the processor and configured to detect light intensity of an environment where the physical interface is located and send the detected light intensity to the processor, wherein the processor may judge whether to send the driving signal to the driving circuit or not according to the received light intensity.

In an example embodiment, the device may further include: a key unit, coupled to the processor and configured to receive input, generated through one or more keys in the key unit, of a user and send the input to the processor, wherein the processor may judge whether to send the driving signal to the driving circuit or not according to the received input.

In an example embodiment, the transparent material and the housing may form an integrated structure.

In an example embodiment, the device may be a mobile terminal.

In an example embodiment, the physical interface may be connected to a Printed Circuit Board (PCB) of the mobile terminal through at least two pins which are located on each of two sides of the physical interface respectively and extend to a respective one of the two sides of the physical interface, wherein a thickness of the physical interface is more than or equal to a sum of thicknesses of the PCB and the luminous part, and the luminous part is arranged between the at least two pins on each of the two sides of the physical interface respectively.

According to the embodiments of the present disclosure, the device with the luminous part arranged at the physical interface is adopted, so that the problem of difficulty in accurately finding the position of the physical interface of the device in the dark environment is solved, the user can conveniently and rapidly identify the position and direction of the physical interface, and a user experience is improved.

BRIEF DESCRIPTION OF THE DRAWINGS

The drawings described here are adopted to provide further understanding of the present disclosure, and form a part of the present disclosure. Schematic embodiments of the present disclosure and description thereof are adopted to explain the present disclosure and not intended to form improper limits to the present disclosure. In the drawings.

DETAILED DESCRIPTION OF THE EMBODIMENTS

The present disclosure will be described below with reference to the drawings and embodiments in detail. It is important to note that the embodiments in the present disclosure and characteristics in the embodiments may be combined under the condition of no conflicts.

Figure 1:
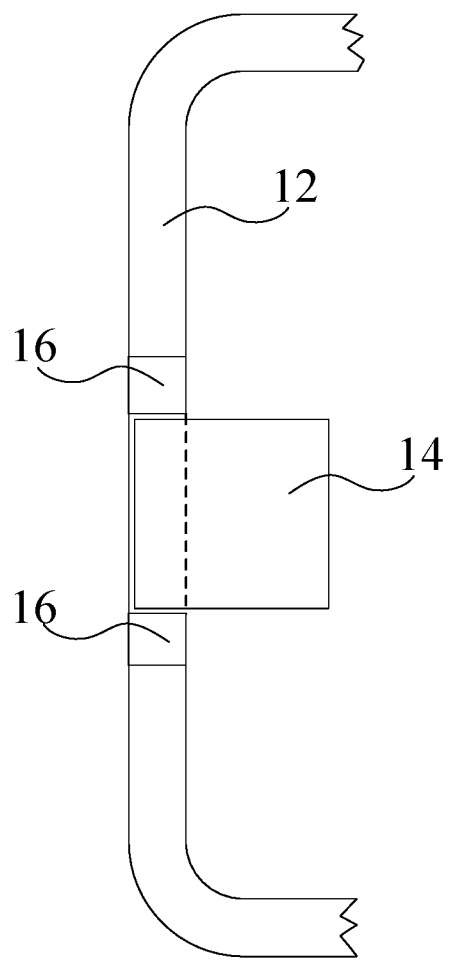
FIG. 1 is a structure diagram of a device including an interface according to an embodiment of the present disclosure.

The embodiment provides a device including an interface. FIG. 1 is a structure diagram of a device including an interface according to an embodiment of the present disclosure. As shown in FIG. 1, the device includes: a housing 12 and a physical interface 14 embedded into the housing, and the device further includes: a luminous part 16, arranged at a position close to the physical interface 14.

According to the device, the luminous part 16 of the device can emit light in a dark environment of an environment where the device is located, so that a user can conveniently and rapidly find a position of the physical interface 14 under the guidance of light emitted by the luminous part 16 in a dark environment, the problem of difficulty in accurately finding the position of the physical interface in a dark environment in the related technology is solved, and an operation experience effect of the user is improved.

In an example embodiment, the luminous part of the device may include one or more LEDs according to a practical condition. For example, the device in the embodiment is a mobile terminal, designs of existing mobile terminals tend to be large and thin, and in order to fully utilize a space of the mobile terminal, the luminous part may include only one LED. If the device is located in a dark environment for long, multiple LEDs may be arranged to meet a requirement of the user in a dark environment.

Figure 2:
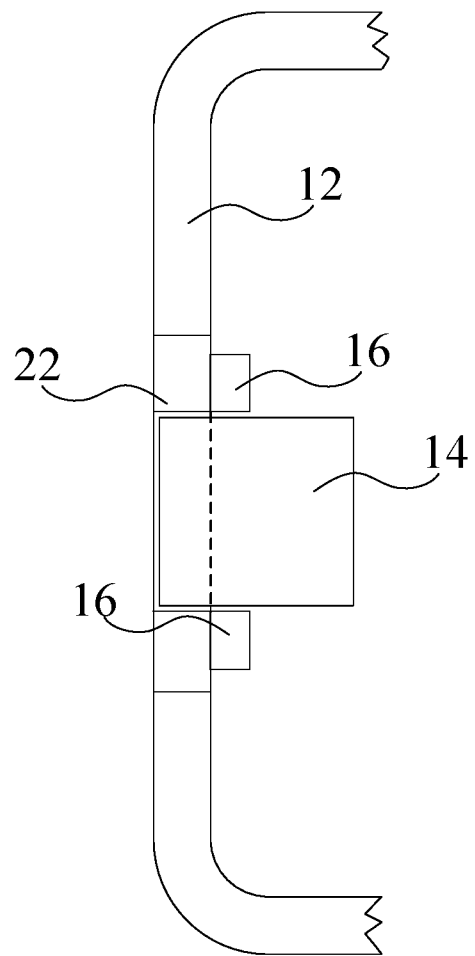
FIG. 2 is a first exemplary structure diagram of a device including an interface according to an embodiment of the present disclosure.

FIG. 2 is a first exemplary structure diagram of a device including an interface according to an embodiment of the present disclosure. As shown in FIG. 2, a part around the physical interface in the housing of the device is made from a transparent material 22, and in such a manner, when the luminous part 16 emits light, a part of light can be externally emitted through the transparent material 22, and the user can find the position of the physical interface more rapidly.

Figure 3:
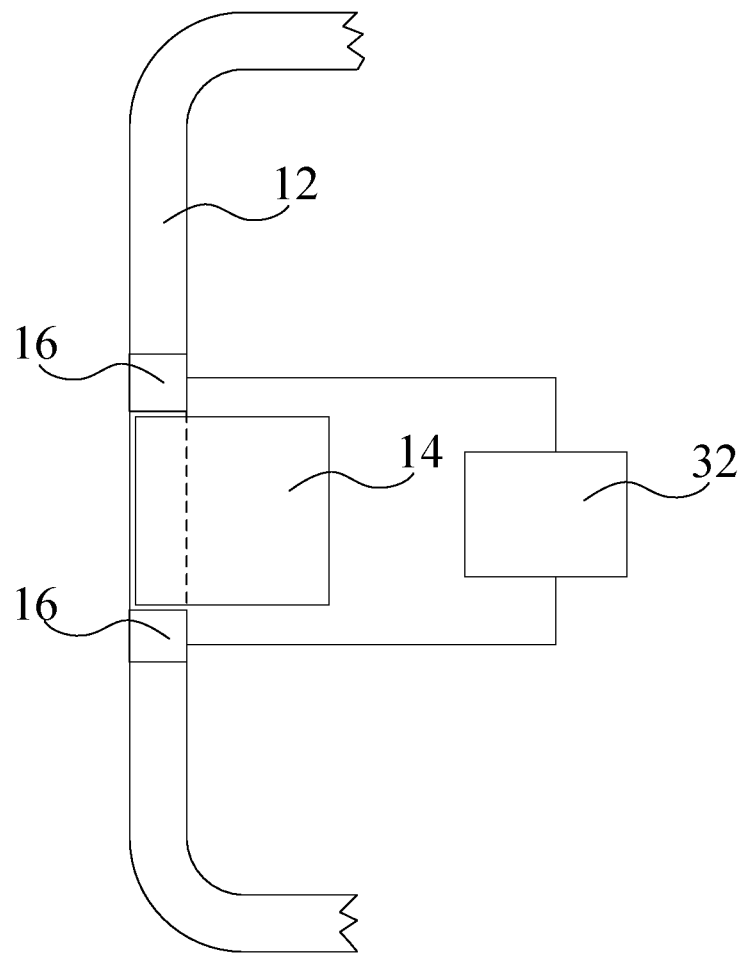
FIG. 3 is a second exemplary structure diagram of a device including an interface according to an embodiment of the present disclosure.

FIG. 3 is a second exemplary structure diagram of a device including an interface according to an embodiment of the present disclosure. As shown in FIG. 3, the device further includes a control part 32, wherein the control part 32 is coupled to the luminous part 16 and configured to control turning-on and turning-off of the luminous part.

Figure 4:
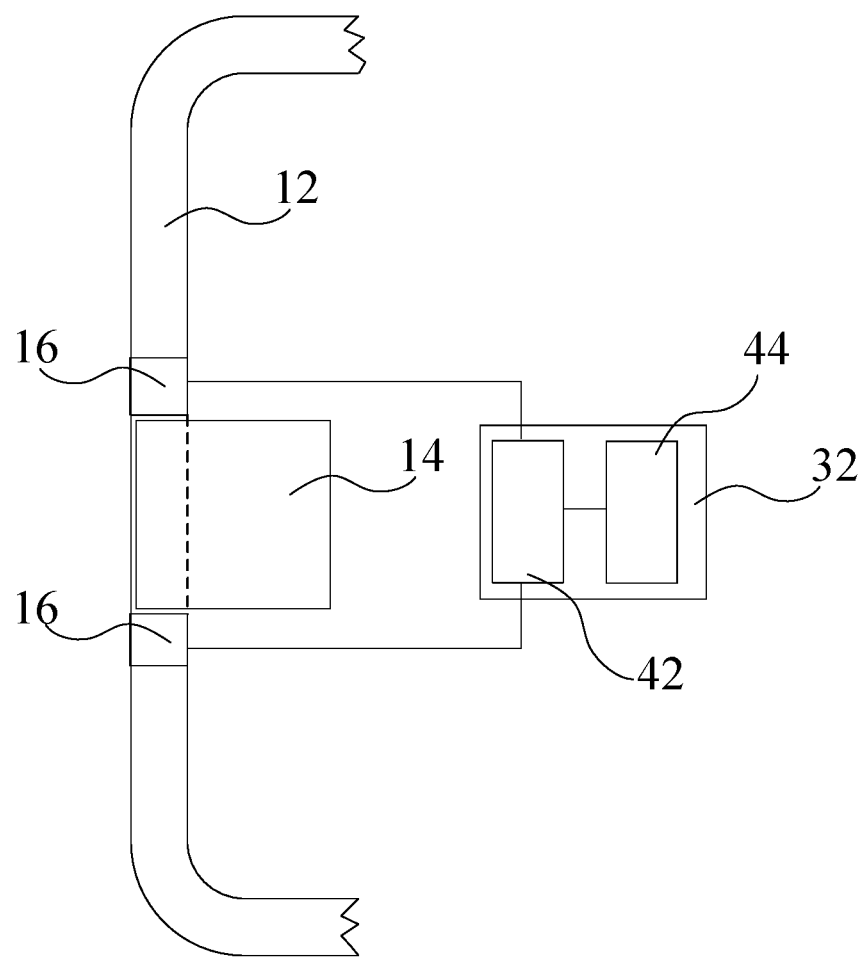
FIG. 4 is a third exemplary structure diagram of a device including an interface according to an embodiment of the present disclosure.

FIG. 4 is a third exemplary structure diagram of a device including an interface according to an embodiment of the present disclosure. As shown in FIG. 4, the control part 32 further includes: a driving circuit 42 and a processor 44, wherein the driving circuit 42 is coupled to the luminous part 16, and the processor 44 is coupled to the driving circuit 42; and the processor 44 is configured to receive information and send an instruction, and the processor 44 sends the instruction to the driving circuit 42 according to content of the received information, and sends a driving signal to instruct the driving circuit 42 to drive the luminous part 16 to emit light after the driving circuit 42 receives the instruction sent by the processor 44.

Figure 5:
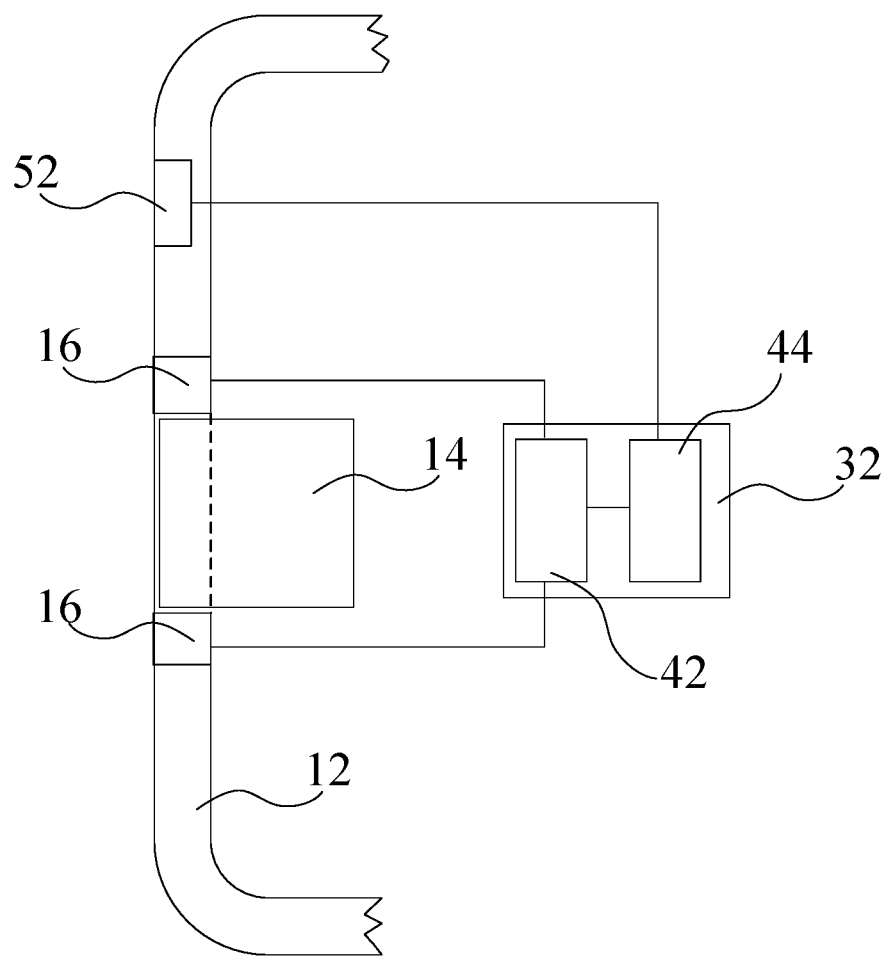
FIG. 5 is a fourth exemplary structure diagram of a device including an interface according to an embodiment of the present disclosure.

FIG. 5 is fourth exemplary structure diagram of a device including an interface according to an embodiment of the present disclosure. As shown in FIG. 5, the control part 32 further includes: a light sensor 52, coupled to the processor 44 and configured to detect light intensity of an environment where the physical interface 14 is located and send the detected light intensity to the processor 44, wherein the processor 44 judges whether to send the driving signal to the driving circuit 42 or not according to the received light intensity.

In an example embodiment, the light sensor 52 detects the light intensity of the environment where the device is located, the light sensor 52 sends the detected light intensity to the processor 44, the processor judges whether the received light intensity is within a preset threshold range or not, and when the light intensity is smaller than a minimum value of a preset threshold, the processor 44 sends an instruction to the driving circuit 42, and sends a driving signal to instruct the driving circuit 42 to drive the luminous part 16 to emit light after the driving circuit 42 receives the instruction sent by the processor 44; and when the light intensity is higher than a maximum value of the preset threshold, the processor 44 may not send any instruction, and the luminous part 16 does not emit light.

Figure 6:
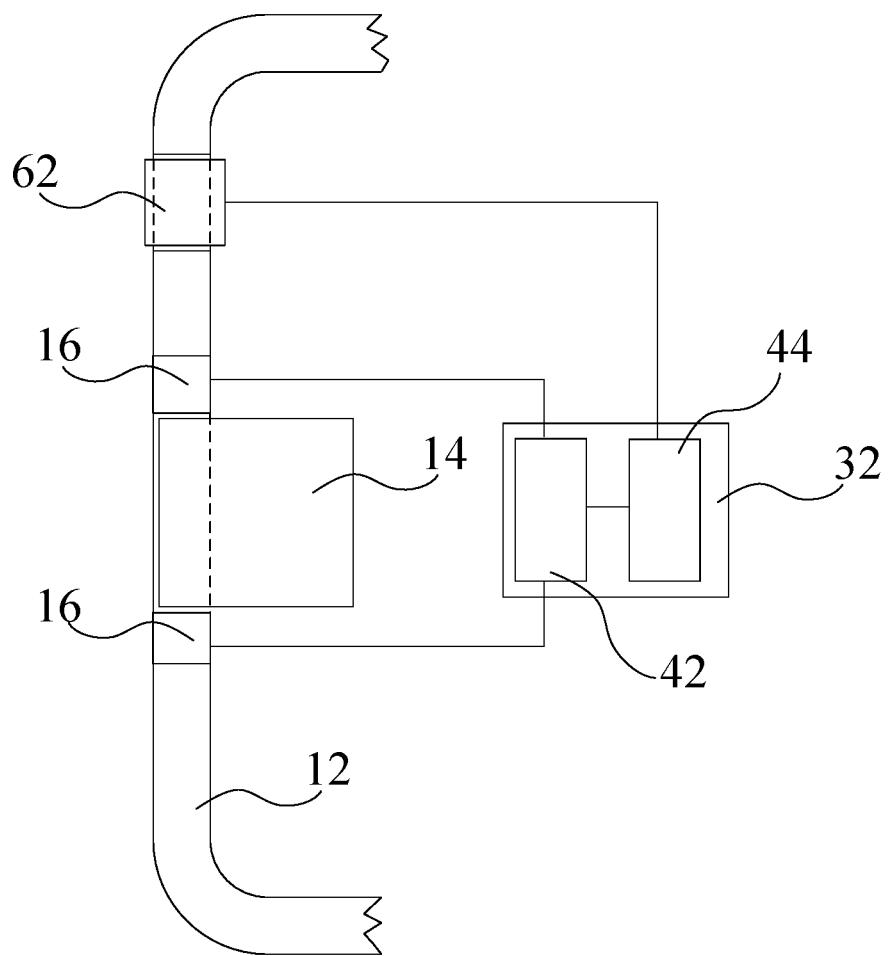
FIG. 6 is a fifth exemplary structure diagram of a device including an interface according to an embodiment of the present disclosure.

FIG. 6 is a fifth exemplary structure diagram of a device including an interface according to an embodiment of the present disclosure. As shown in FIG. 6, the control part 32 further includes: a key unit 62, coupled to the processor 44 and configured to receive input, generated through one or more keys in the key unit 62, of the user and send the input to the processor 44, wherein the processor 44 judges whether to send the driving signal to the driving circuit 42 or not according to the received input.

In an example embodiment, the transparent material 22 and the housing 12 form an integrated structure.

In an example embodiment, the physical interface 14 is a USB interface, and is formed in a mobile terminal.

Figure 7:
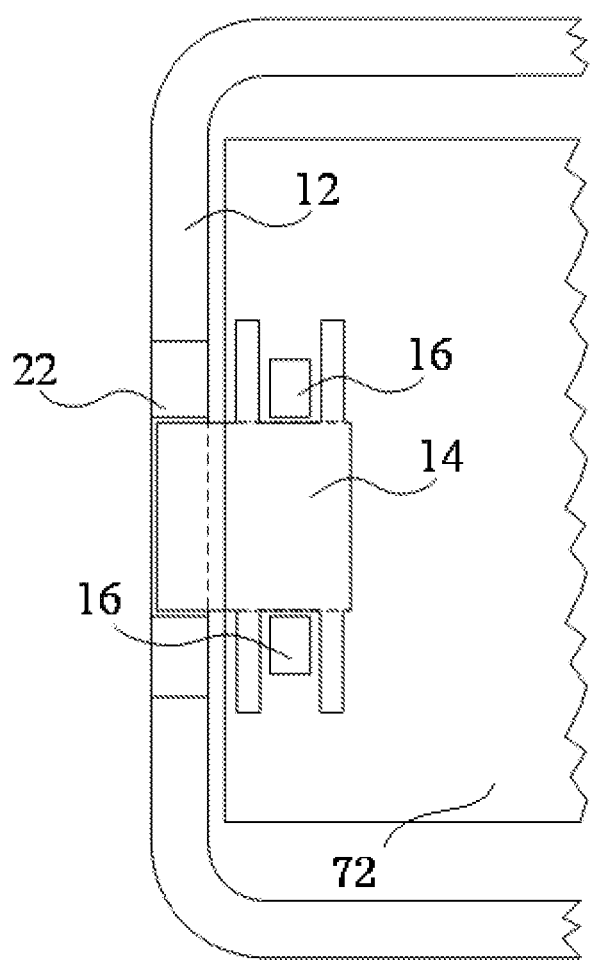
FIG. 7 is a sixth exemplary structure diagram of a device including an interface according to an embodiment of the present disclosure.

FIG. 7 is a sixth exemplary structure diagram of a device including an interface according to an embodiment of the present disclosure. As shown in FIG. 7, the physical interface 14 is connected to a PCB 72 of the mobile terminal through at least two pins which are located on each of two sides of the physical interface respectively and extend to a respective one of the two sides of the physical interface, wherein a thickness of the physical interface 14 is more than or equal to a sum of thicknesses of the PCB 72 and the luminous part 16, and the luminous part 16 is arranged between the at least two pins on each of the two sides of the physical interface 14 respectively.

The embodiment will be described below with reference to an exemplary embodiment and FIG. 8, FIG. 9 and FIG. 10. Descriptions will be given in the following exemplary embodiment with a mobile phone as an example, wherein a physical interface is a USB female interface in a USB interface.

The exemplary embodiment provides a prompting device for a USB interface of a mobile phone, which includes a mobile phone housing with a transparent material, a USB female interface and an LED and control module.

The LED and control component includes one or more LEDs and an LED switching control circuit. LEDs have the characteristics of energy saving, reliability, long service life, high luminous efficiency and the like, and are widely applied to mobile phones at present. The LED and control component mainly implements switching operation over the one or more LEDs and provides a driving interface so that software can call the LED and control component. As shown in FIG. 8, since implementation manners adopted by each platform for the LED and control component are different, but adopt similar and simple principles, so only an LED control frame is described in the figure.

Figure 9:
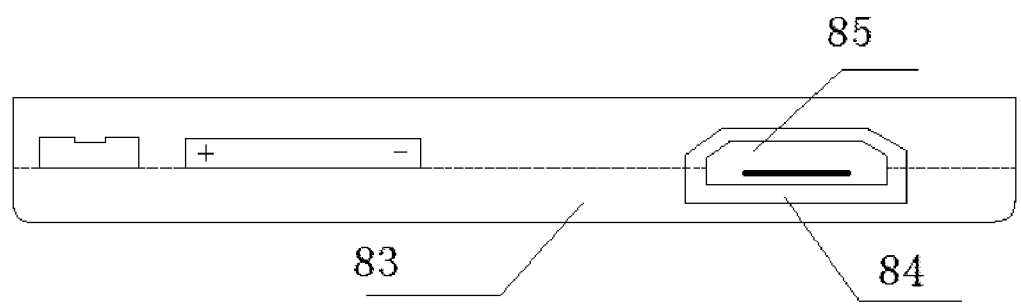
FIG. 9 is a structure diagram of a mobile phone housing with a USB interface surrounded by a transparent material according to an exemplary embodiment of the present disclosure.

Housings of mobile phones on the market usually adopt non-transparent materials, and in order to make light emitted by the one or more LEDs visible for a user, the USB interface is surrounded by a circle of transparent material at a position of the USB interface of the housing in the present disclosure, wherein a width of the transparent material is preferably determined to be matched with the light emitted by the one or more LEDs to reach a high identification degree without influence on a structure of the mobile phone and strength of the housing, and the transparent material is preferably integrated with the housing of the mobile phone so as to facilitate the user to disassemble the mobile terminal, as shown in FIG. 9.

The USB female interface is the USB interface in the mobile phone, and its direction is consistent with a direction of a nick surrounded by the transparent material in the housing. Under the condition that the USB interface is much thicker than a PCB, there are spaces for creating conditions for scattering of the light on two sides of the USB interface. Therefore, placing two LEDs on the two sides of the USB interface will not influence the structure of the mobile phone. A layout position relationship between the one or more LEDs and the USB interface is shown in FIG. 10, and is intended to make the public better understand the technical contents rather than make any limit.

The one or more LEDs may be turned on in some specific scenarios to provide a prompt about a position of a USB charger for the user in a place with insufficient light, so that the user can well identify the position and direction of the USB interface, and convenience is brought to charging operation of the user.

Descriptions will be given below with reference to the exemplary embodiment in a specific application scenario.

In order to facilitate understanding of those skilled in the art, the present disclosure will be further described below with reference to FIG. 8, FIG. 9, FIG. 10 and a specific embodiment in detail. It should be pointed out that the specific embodiment described here is only adopted to explain the exemplary embodiment and not intended to limit the present disclosure.

Figure 8:
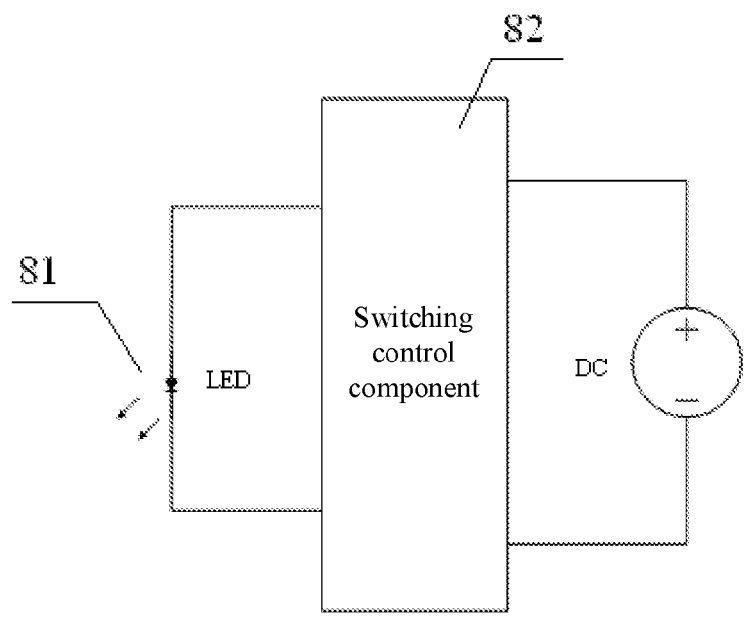
FIG. 8 is a structure diagram of a switching control component according to an exemplary embodiment of the present disclosure.
Figure 10:
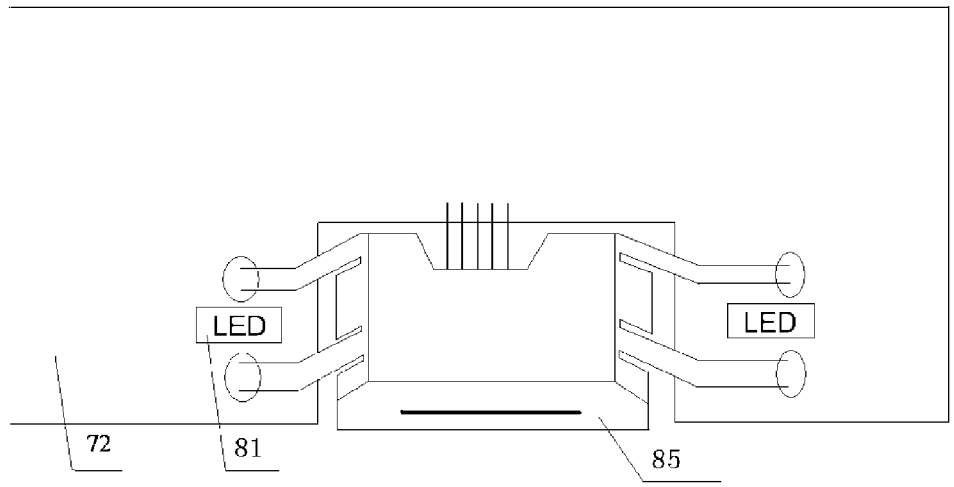
FIG. 10 is a diagram of a position relationship between one or more LEDs and a USB interface according to an exemplary embodiment of the present disclosure.

As shown in FIGS. 8, 9 and 10, a prompting device for a USB charging interface of a mobile phone in the exemplary embodiment includes one or more LEDs 81, an LED switching control component 82, a mobile phone housing 83 (equivalent to the housing 12), a transparent material 84 surrounding a USB interface, the USB interface 85 and a PCB 72.

As shown in FIG. 8, the LED switching control component 82 provides a switching operation interface for the one or more LEDs 81, an implementation manner of the technology is mature, and will not be elaborated herein, and switching operation scenarios are as follows:

Scenario 1: in a powered-off state, if a user wants to charge rather than turn on the mobile phone or power of a battery is insufficient to turn on the mobile phone, the user is required to press a power button or another key (such as a lateral volume key) for short to turn on the one or more LEDs 81, and the key pressing operation needs to be distinguished from long pressing operation for turning on the mobile phone; and Scenario 2: in a powered-on state, the user turns on a screen and the phone is in a to-be-unlocked state, luminance of an environment where the mobile phone is located can be detected by virtue of an existing light sensor, the one or more LEDs 81 are turned on to prompt the user about a position of the USB interface 85 when the luminance is lower than a certain threshold, the one or more LEDs 81 are turned off after the user unlocks the screen, and meanwhile, under the condition that the luminance is higher than a certain threshold, the one or more LEDs 81 may not be turned on to fulfill the aim of power saving and achieve a good user experience.

Here, only the scenarios for operating the one or more LEDs on software are described with examples, manners for turning on the one or more LEDs 81 may include regular constant light emission, flickering and the like, scenarios 1 and 2 may be implemented in a universal boot (Uboot) and a software version respectively to fulfill the aim that the one or more LEDs 81 can be operated in both the powered-off and powered-on states, and similarly, there are no limits to the scenarios, so that fulfillment of the aim of operating the one or more LEDs 81 to illuminate the USB interface 85 or realizing a similar function with adoption of the similar scenario and software implementation manner shall fall within the technical solutions, required to be protected, of the present disclosure.

As shown in FIG. 9, the device of the embodiment of the present disclosure includes the mobile phone housing 83 with the transparent material 84 surrounding the USB interface 85, and different from an ordinary mobile phone housing, the mobile phone housing 83 of the embodiment of the present disclosure forms an integrated convenient-to-disassemble housing with the transparent material 84, a shape and direction of the transparent material 84 are required to be kept consistent with the USB interface 85, and a width of the transparent material is preferably determined without influence on a structure of the mobile phone and strength of the housing, and is required to be matched with light emitted by the one or more LEDs 81 to reach a high identification degree.

As shown in FIG. 10, the USB interface 85 is welded on the PCB 72. Since the USB interface 85 is much thicker than the PCB 72, there may exist a certain space between another mobile phone device such as a display screen above the PCB 72 and the PCB 72 to create a condition for scattering of the light emitted by the one or more LEDs 81. Here, the one or more LEDs 81 are designed to be arranged between left and right pins of the USB interface 85, so that the one or more LEDs 81 may be maximally close to an edge of a lateral surface of the mobile phone without influence on a structural design. In fact, arrangement of multiple LEDs 81 around the USB interface 85 for realizing the same or similar function with adoption of the same or similar principle shall fall within the technical solutions, required to be protected, of the present disclosure.

INDUSTRIAL APPLICABILITY

According to the device of the embodiment of the present disclosure, under the condition that light of the environment where the device is located is dark, the luminous part 16 of the device may emit light, so that the user can conveniently and rapidly find the position of the physical interface 14 under the guidance of the light emitted by the luminous part 16 in a dark environment, the problem of difficulty in accurately finding the position of the physical interface in a dark environment in the related technology is solved, and the operation experience effect of the user is improved.

In conclusion, the above is only the exemplary implementation mode of the present disclosure and description about the scenario and manner for operating the LEDs to prompt the user to position the USB interface with an example and certainly not intended to limit the scope of the present disclosure. It should be pointed out that those skilled in the art may make various modifications and variations to the present disclosure. Any modifications, equivalent replacements, improvements and the like made within the principle of the present disclosure shall fall within the scope of protection defined by the claims of the present disclosure.

What is claimed is:

1. A mobile terminal comprising an interface, wherein the mobile terminal comprises a housing and a physical interface embedded into the housing, and further comprises:
    a luminous part, arranged at a position close to the physical interface;
    wherein the physical interface is connected to a Printed Circuit Board (PCB) of the mobile terminal through at least two pins which are located on each of two sides of the physical interface respectively and extend to a respective one of the two sides of the physical interface, wherein a thickness of the physical interface is more than or equal to a sum of thicknesses of the PCB and the luminous part, and the luminous part is arranged between the at least two pins on each of the two sides of the physical interface respectively.

2. The mobile terminal as claimed in claim 1, wherein the luminous part comprises one or more Light Emitting Diodes (LEDs).

3. The mobile terminal as claimed in claim 1, wherein a part around the physical interface in the housing is made from a transparent material.

4. The mobile terminal as claimed in claim 1, further comprising:
    a control part, coupled to the luminous part and configured to control turning-on and turning-off of the luminous part.

5. The mobile terminal as claimed in claim 4, wherein the control part comprises:
    a driving circuit, coupled to the luminous part and configured to drive the luminous part to emit light; and
    a processor, coupled to the driving circuit and configured to send a driving signal to the driving circuit according to received information, wherein the driving signal is used for instructing the driving circuit to drive the luminous part to emit light.

6. The mobile terminal as claimed in claim 5, wherein the control part further comprises:
    a light sensor, coupled to the processor and configured to detect light intensity of an environment where the physical interface is located and send the detected light intensity to the processor, wherein the processor judges whether to send the driving signal to the driving circuit or not according to the received light intensity.

7. The mobile terminal as claimed in claim 5, further comprising:
    a key unit, coupled to the processor and configured to receive input, generated through one or more keys in the key unit, of a user and send the input to the processor, wherein the processor judges whether to send the driving signal to the driving circuit or not according to the received input.

8. The mobile terminal as claimed in claim 3, wherein the transparent material and the housing form an integrated structure.

* * * * *